(12) United States Patent
Choi

(10) Patent No.: US 6,626,550 B2
(45) Date of Patent: Sep. 30, 2003

(54) BACKLIGHT UNIT FOR LIQUID CRYSTAL DISPLAY DEVICE

(75) Inventor: Seong-Sik Choi, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 232 days.

(21) Appl. No.: 09/832,914

(22) Filed: Apr. 12, 2001

(65) Prior Publication Data

US 2002/0044234 A1 Apr. 18, 2002

(30) Foreign Application Priority Data

Oct. 13, 2000 (KR) ........................................ 2000-60331

(51) Int. Cl.[7] ............................................. G02F 1/1335
(52) U.S. Cl. ..................... 362/31; 362/26; 362/330; 349/65; 385/146; 385/133
(58) Field of Search ......................... 362/26, 30, 31, 362/330, 551, 559, 561, 812, 800; 349/58, 61, 62, 65, 12, 63; 385/129, 130, 146, 901, 133; 40/549, 563, 546

(56) References Cited

U.S. PATENT DOCUMENTS

| | | | |
|---|---|---|---|
| 5,988,827 A | * | 11/1999 | Lee .............................. 362/31 |
| 6,046,785 A | * | 4/2000 | Won ............................ 349/58 |
| 6,512,557 B1 | * | 1/2003 | Miwa ........................... 349/58 |

* cited by examiner

*Primary Examiner*—Sandra O'Shea
*Assistant Examiner*—Hargobind S. Sawhney
(74) *Attorney, Agent, or Firm*—McGuireWoods LLP

(57) ABSTRACT

A backlight unit for a display device includes a light guide panel comprising a plate-shaped body, at least one light guide projection for fitting the light guide panel disposed on left side or right side of the plate-shaped body, and a plurality of patterns formed on a lower surface of the plate-shaped body to uniformly project light. Upper and lower surfaces of the light guide projection are disposed remote as much as predetermined intervals, respectively from planes extended from upper and lower surfaces of the plate-shaped body. The light guide projection further includes an inclined surface on a side adjacent to a light source to prevent the light guide projections from cracking. Also, the light guide projection has at least one rounded or chamfered corner in order to efficiently prevent light concentration.

27 Claims, 7 Drawing Sheets

BACKLIGHT UNIT FOR LIQUID CRYSTAL DISPLAY DEVICE

FIELD OF THE INVENTION

The present invention relates to a liquid crystal display device, and more particularly to the backlight unit that guides light to the display panel.

BACKGROUND OF THE INVENTION

A liquid crystal display (LCD) is a passive display that is not able to emit light by itself. Accordingly, it requires to use a source of light to project light through the display panel in order to display all sorts of information.

The source of light may be supplied by a backlight unit. The backlight unit functions as a component of liquid crystal display device to guide light to the display panel in apparatus such as liquid crystal display monitors, portable computers, and navigation systems for vehicles.

With the needs of a large sized display area and a small sized system, a backlight unit has been changed from rear-disposed lamp type in which a lamp is disposed at the rear to side-disposed lamp type in which a lamp is disposed at the side. A backlight unit of side-disposed lamp type generally includes a mold frame, a light source such as a cold cathode fluorescent tube of 23 mm in diameter, a reflecting sheet for reflecting ahead light projected from the light source, a light guide panel for guiding ahead light reflected from the reflecting sheet, a diffusing sheet for diffusing uniformly light guided through the light guide panel, a prism sheet for enhancing the luminance of light passed through the diffusing sheet, and a protecting sheet for protecting the prism sheet. The reflecting sheet, light guide panel, diffusing sheet, prism sheet and protecting sheet are mounted in grooves of the mold frame. The light guide panel is a plate-shaped body made of transparent materials such as acrylic resin, and has the shape of which thickness at the portion thereof remote from the light source is getting gradually smaller than that of the portion thereof adjacent to the light source.

In order to fix the reflecting sheet, light guide panel, diffusing sheet, prism sheet and protecting sheet to the grooves of the mold frame, method using an adhesive or method forming light guide projections and the other grooves respectively in the light guide panel and in left and right sides of the mold frame to fit the light guide projections to the grooves has been used. However, in the latter case the light guide projections have right-angled corners, reflection and transmission of light are repeated in space between the light guide panel and the mold frame so that light may be concentrated at the right-angled corners of the light guide projections of the light guide panel. As a result of this concentration, the light guide projections of the guide panel may be brighter compared to other portions. The concentrated light may result in a poor quality LCD.

To solve this problem, there has been proposed a conventional backlight unit as disclosed in U.S. Pat. No. 5,988,827. In the backlight unit, corners of light guide projections remote from a lamp are rounded. Grooves of a mold frame corresponding to the shape of the rounded corners of the light guide projections are also rounded. By virtue of this structure, the rounded corners of the light guide projections can efficiently prevent light from being concentrated. However, it is still possible that right-angled recess portions between the light guide projections and a body of a light guide panel can be cracked when an LCD module is shaken or impacted. FIG. 1 is a perspective view illustrating a conventional light guide panel cracked by impact in direction Y. When the light guide projections is impacted by shaking of the LCD module, stress is concentrated on point P in the light guide panel. The reason is that stress at point P is about 27% larger than that at point Q. If stress at point P exceeds the yield stress, a crack 14 can be developed from point P. The crack 14 may have the light guide panel and the display panel render a poor image, resulting in a poor quality LCD. Also, if the light guide panel is excessively cracked, the light guide projections can be disengaged from the grooves such that the light guide panel can be slid to the lamp and damage it.

Accordingly, it needs an improved backlight unit having an anti-impact light guide panel for the LCD module for a mobile apparatus such as portable computers and personal digital assistants (PDAs) that are frequently exposed to impacts by falling or external forces compared to other display devices.

SUMMARY OF THE INVENTION

It is an object of the present invention to provide improved backlight units for liquid crystal display devices.

It is another object of the present invention to provide light guide panels and backlight units that can prevent impact forces by falling or external forces from cracking portions of LCD such as light guide projections and light sources and also reduce or eliminate light concentration at the portions of the LCD, thereby improving the quality of the LCD.

These and other objects are provided, according to the present invention, by a light guide panel comprising a plate-shaped body, light guide projections for fitting the light guide panel disposed on left and right sides of the plate-shaped body, and a plurality of patterns formed on a lower surface of the plate-shaped body to uniformly project light, wherein upper and lower surfaces of the light guide projections are disposed remote as much as predetermined intervals, respectively from planes that are extended from upper and lower surfaces of the plate-shaped body. It is preferable that each of light guide projections further include an inclined surface on a side thereof adjacent to a light source. The inclined surface may effectively prevent impact forces in direction Y from developing a crack at point P or Q in a right-angled recess portion of the light guide projections as shown in FIG. 1. Preferably, each of light guide projections has at least one rounded corner in order to efficiently prevent light from being concentrated. Alternatively, each of light guide projections has at least one chamfered corner.

In particular, a backlight unit of the invention includes a mold frame having grooves formed in left and right sides thereof and a light source such as a cold cathode fluorescent tube disposed on lower side thereof, a light guide panel having a plate-shaped body and light guide projections disposed on left and right sides of the plate-shaped body, and a plurality of sheets. Each of light guide projections has a thickness smaller than that of the plate-shaped body. The light guide panel is mounted on the mold frame so that the light guide projections thereof are fit to the grooves. A plurality of sheets comprises a reflecting sheet, a diffusing sheet, prism sheets, and a protecting sheet. Each of light guide projections further includes an inclined surface on a side thereof adjacent to the light source. Preferably, each of light guide projections has at least one rounded or chamfered corner in order to efficiently prevent light concentration.

The backlight unit of the invention may be used to form various systems with liquid crystal display devices. The liquid crystal display device comprises a housing, a display panel disposed in the housing, a backlight unit disposed behind the display panel, and a top chassis combined with a mold frame of the backlight unit to fixedly hold components of the backlight unit and the display panel.

Thus, the present invention can reduce the chances that external forces of falling or bending crack portions of the LCD such as the light guide projections, by making the light guide projections thinner than that of the light guide panel and forming the inclined surface on the light guide projections.

The present invention also can reduce or eliminate light concentration at the portions of the LCD by rounding or chamfering the corners of the light guide projections.

DETAILED DESCRIPTION OF PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein. Like numbers refer to like elements throughout.

Figure 5:
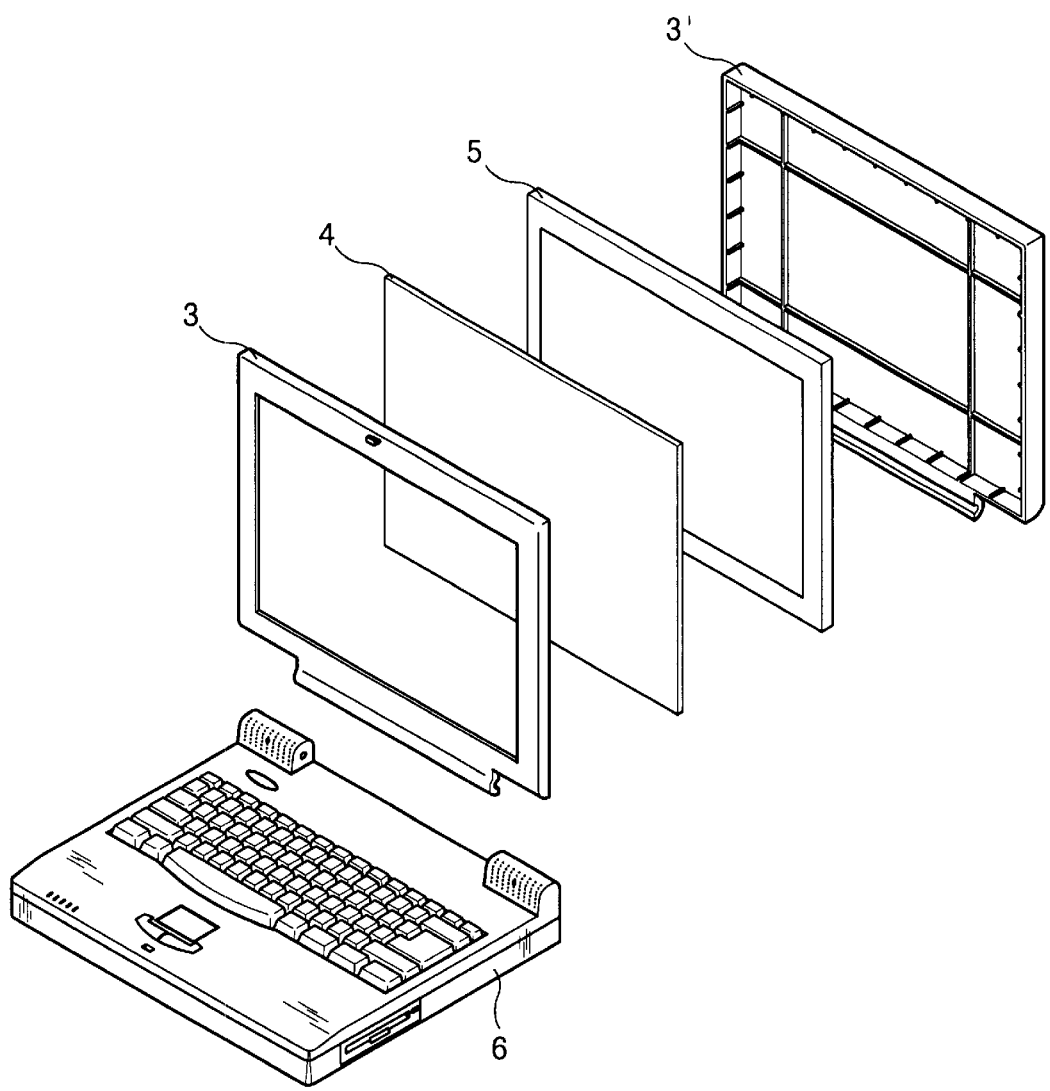
FIG. 5 is an exploded perspective view of portable computers in which a backlight unit in accordance with the present invention is mounted.

Referring now to FIG. 5, there is illustrated a potable computer having a liquid crystal display device in which a backlight unit 5 in accordance with the present invention is mounted.

The liquid crystal display device includes a housing having a window-shaped upper cover 3 and a opened-box type lower cover 3', a display panel 4 for displaying all sorts of information, a backlight unit 5 of the present invention for guiding light to the display panel 4, and a top chassis (not shown) for holding and protecting the display panel 4 and components of the backlight unit 5.

Figure 3:
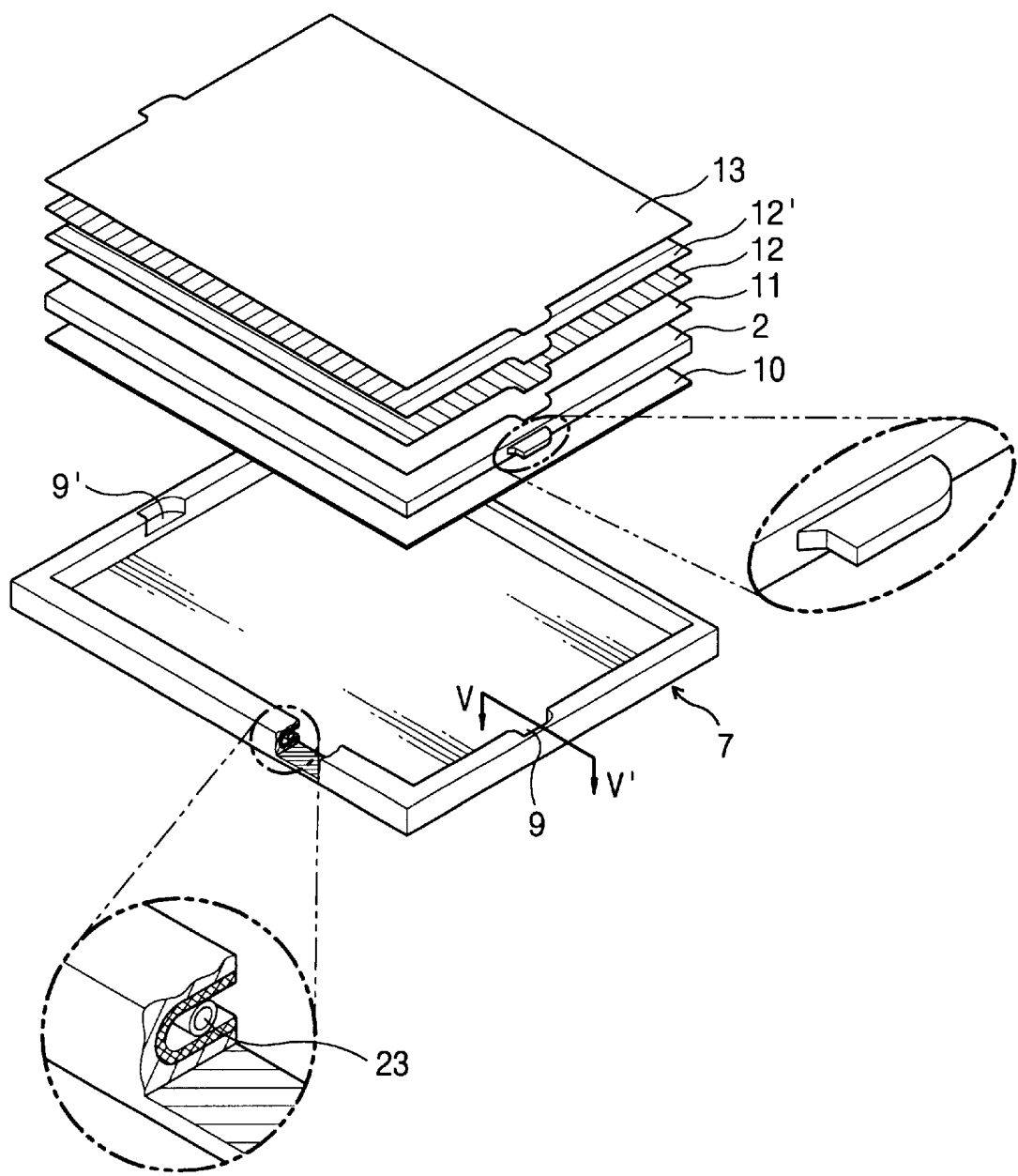
FIG. 3 is an exploded perspective view of a backlight unit in accordance with the present invention.
Figure 4:
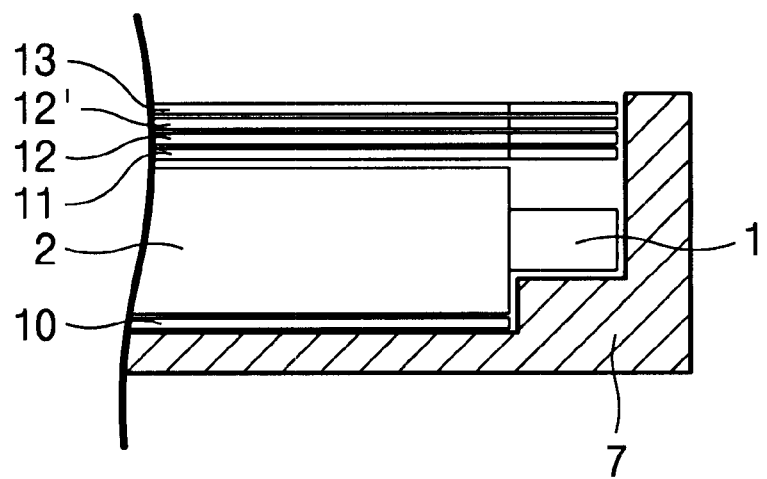
FIG. 4 is a cross-sectional view of a backlight unit taken along arrows V—V' of FIG. 3

The backlight unit 5 of the present invention includes a plurality of sheets 10, 11, 12, 12', 13, a mold frame 7, a light source 23 such as a cold cathode fluorescent tube mounted on a side of the mold frame 7, and a light guide panel 2 for guiding light to the front, as shown in FIG. 3.

A plurality of sheets comprises a reflecting sheet 10 disposed under the light guide panel 2 to reflect light projected from the light source 23, to the light guide panel 2, a diffusing sheet 11 disposed on the light guide panel 2 to uniformly diffuse light guided from the light guide panel 2, prism sheets 12, 12' disposed on the diffusing sheet 11 to enhance the luminance of light passed through the diffusing sheet 11, and a protecting sheet 13 disposed on prism sheet 12' to protect it. The mold frame 7 functions to receive the light source 23, the light guide panel 2, and a plurality of sheets 10, 11, 12, 12', 13. The mold frame 7 also includes grooves 9, 9' formed in left and right sides thereof adjacent to the side thereof in which the light source 23 is disposed.

Projections disposed on left and right sides of the light guide panel 2 and a plurality of sheets 10, 11, 12, 12', 13, as described below, can be fit to the grooves 9, 9' of the mold frame 7 so that the mold frame 7 can fixedly hold the light guide panel 2 and a plurality of sheets 10, 11, 12, 12', 13.

Figure 1:
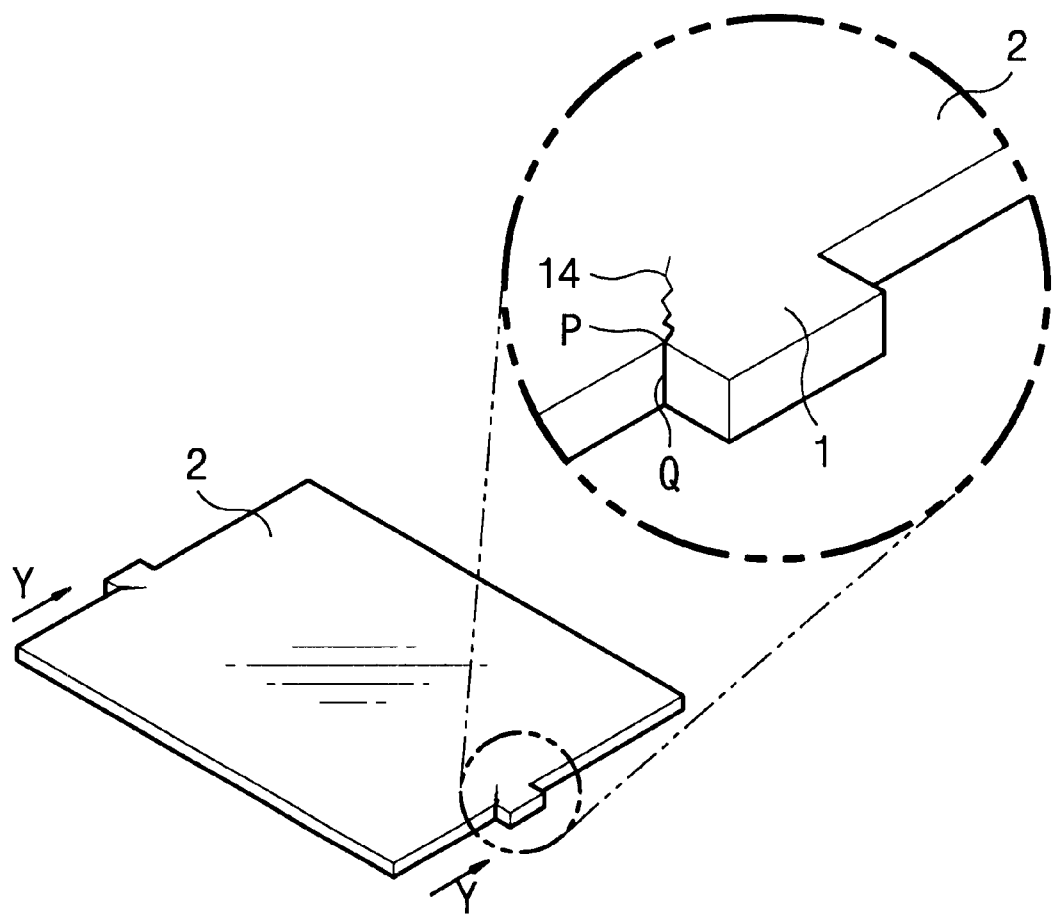
FIG. 1 is a perspective view illustrating light guide projections of a conventional light guide panel cracked by impact forces in direction Y.
Figure 2A:
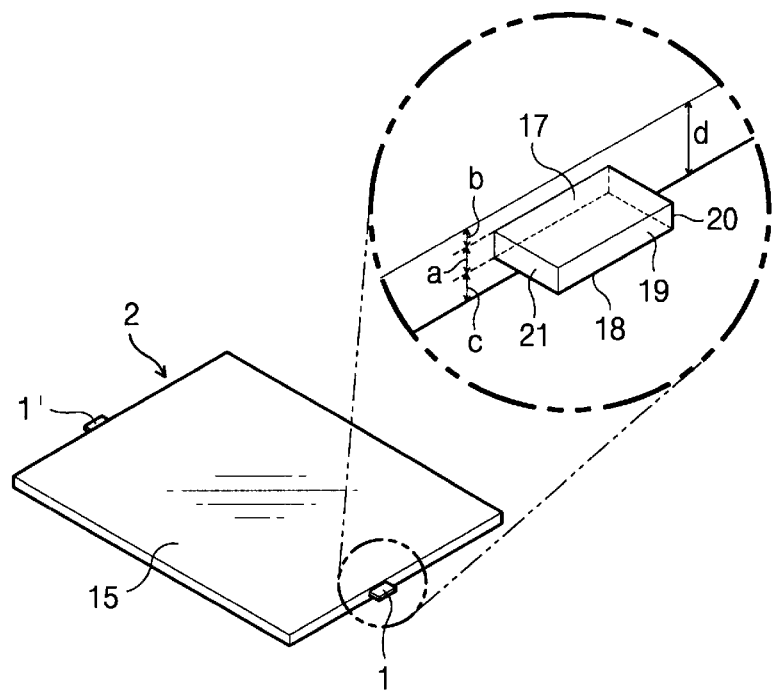
FIGS. 2a to 2e are perspective views illustrating various embodiments of a light guide panel of a backlight unit in accordance with the present invention.

Referring now to FIG. 2a, a light guide panel 2 of the backlight unit in accordance with the present invention includes a plate-shaped body 15, light guide projections 1, 1' for fitting the light guide panel 2 disposed on the respective middle of left and right sides of the plate-shaped body 15, and a plurality of patterns (not shown) formed on a lower surface of the plate-shaped body 15 to uniformly project light.

The plate-shaped body 15 is fabricated from transparent materials such as acrylic resin. Also, the plate-shaped body 15 becomes gradually thinner as it goes away from the side close to the light source 23.

Each of the light guide projections 1,1' has a upper surface 17, a lower surface 18, first side surface 19 disposed parallel to the left or right sides of the plate-shaped body 15, second side surface 20 disposed adjacent the first side surface 19 and remote from the light source 23, and third side surface 21 disposed adjacent the first side surface 19 and the light source 23. The shape of the light guide projection 1 or 1' is rectangle.

As shown in FIG. 2a, the upper and lower surfaces 17, 18 of the light guide projections 1, 1' are disposed remote as much as predetermined intervals b, c, respectively from planes which are extended from the upper and lower surfaces of the plate-shaped body 15 so that thickness a of the light guide projections 1, 1' is smaller than thickness d of the plate-shaped body 15. Intervals b, c can be determined to be same or different from each other.

Figure 2B:
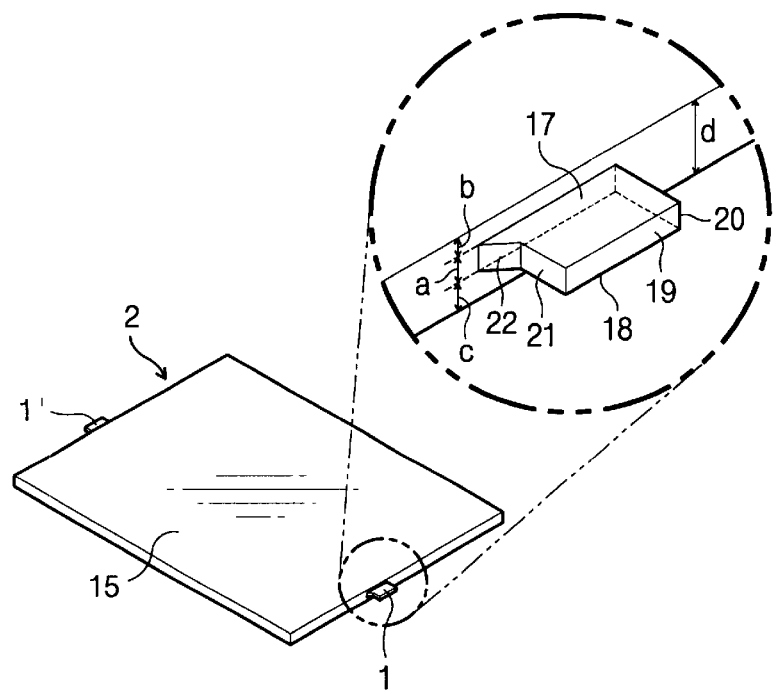

As shown in FIG. 2b, light guide projections 1,1' of light guide panel 2 can include an inclined surface 22 disposed on recess portion thereof which third side surface 21 thereof is bordered on left or right side of plate-shaped body 15. The inclined surface 22 reduces stress concentrated to the recess portion.

Figure 2C:
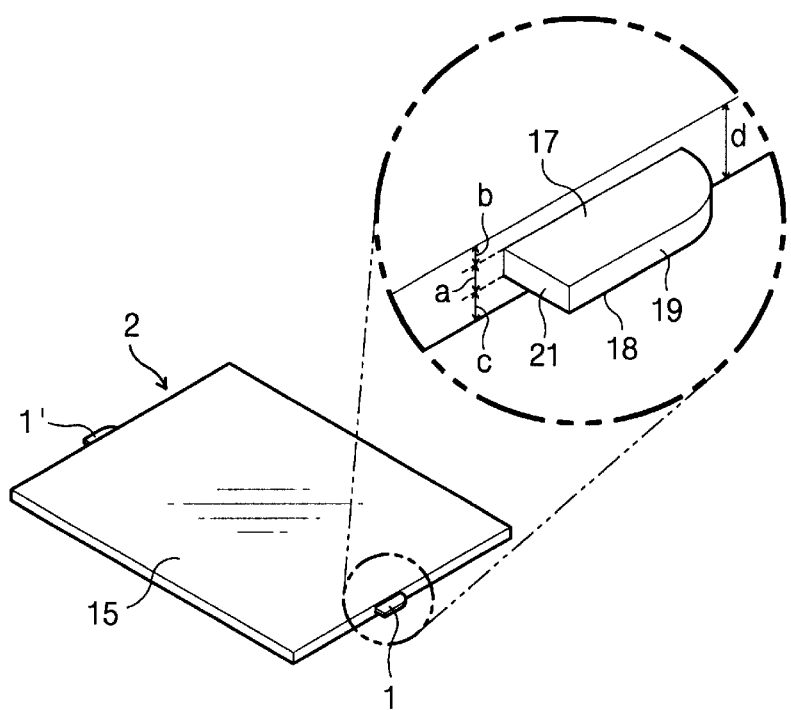
Figure 2D:
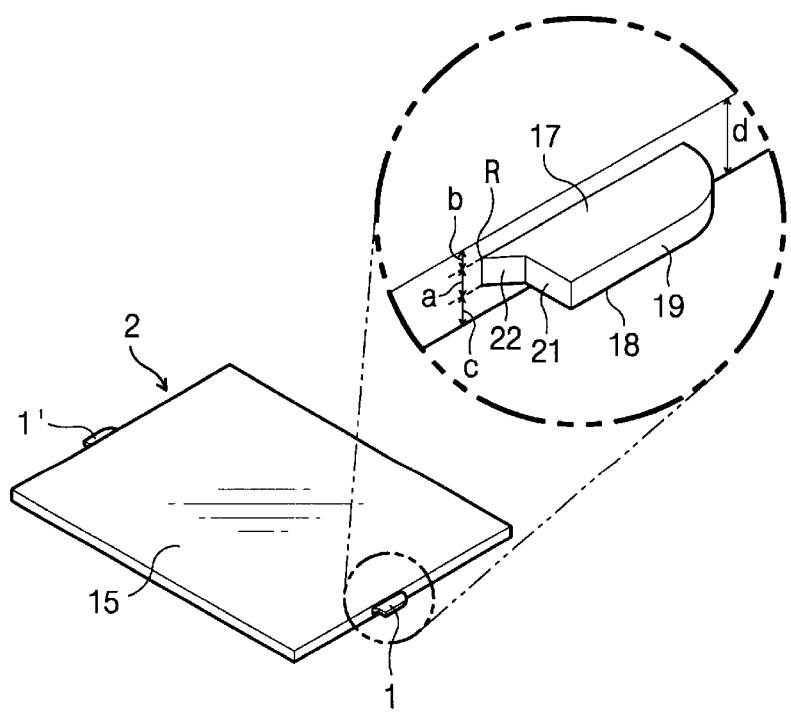

It is preferable to make corners between first side surface 19 and second side surface 20 of light guide projections 1,1' to be rounded in order to efficiently prevent light concentration, as shown in FIGS. 2c and 2d. For example, each of light guide projections 1,1' of light guide panel 2 has a rounded corner between the first side surface 19 and the second side surface 20 and a right-angled corner between the first side surface 19 and third side surface 21, as shown in FIGS. 2c and 2d.

For this purpose, corners between the first side surface 19 and the third side surface 21 of the light guide projections 1,1' can also be rounded.

Also, as shown in FIG. 2d, the light guide projections 1,1' of the light guide panel 2 can include an inclined surface 22 on recess portion between the third side surface 21 thereof and the left or right side of the plate-shaped body 15 to reduce stress concentrated to the recess portion.

Figure 2E:
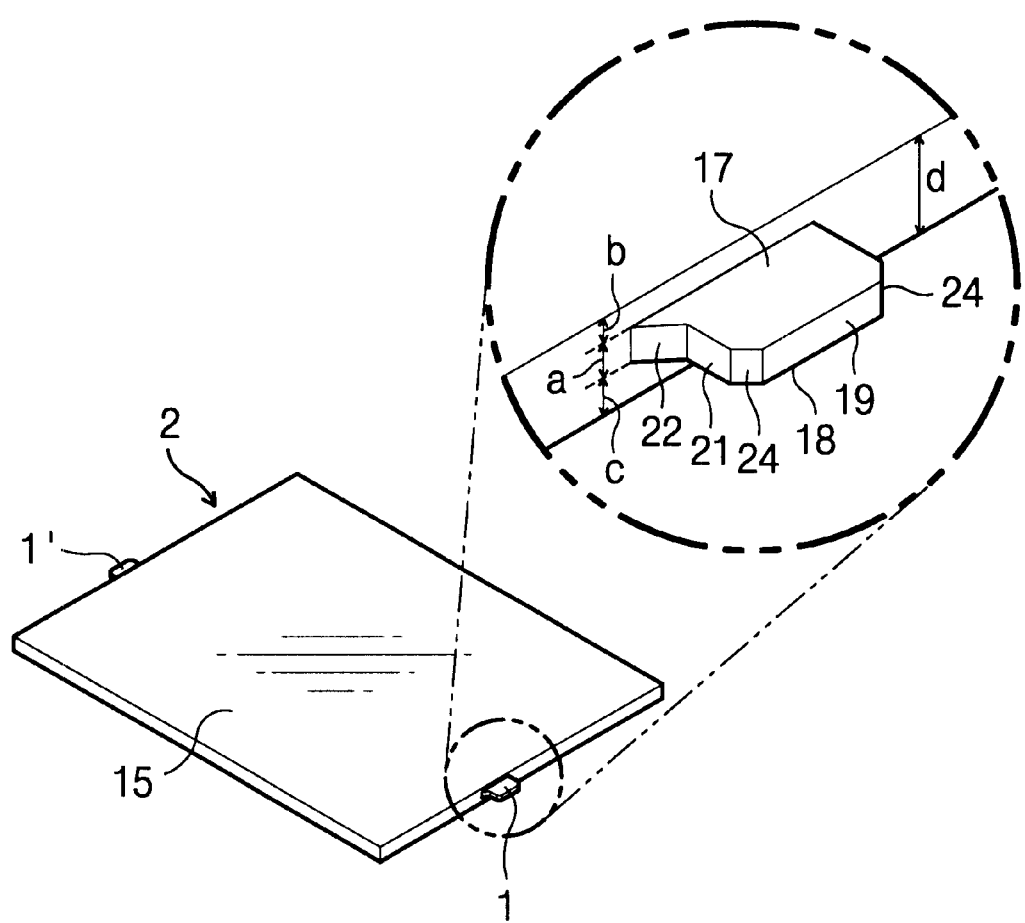

Referring to FIG. 2e, corners between first side surface 19 and second and third side surfaces 20, 21 of light guide projections 1,1' are chamfered to efficiently prevent light concentration. Chamfering is properly performed to the extent that can prevent the light guide panel 2 from being slid to a light source. The reason is that, in case chamfering is excessively performed, it is possible that the light guide projections 1,1' may be disengaged from grooves of the mold frame thereby to make the light guide panel 2 to damage the light source 23 with small external forces to the LCD module.

The light guide projections 1,1' of the light guide panel 2 also includes an inclined surface 22 disposed on recess portion between the third side surface 21 thereof and left or right side of the plate-shaped body 15 to reduce stress concentrated on the recess portion.

As apparent from the foregoing description, it can be appreciated that a backlight unit for a display device in accordance with the present invention can prevent impact forces by falling from cracking the light guide projections, thereby improving the quality of the LCD, by making the light guide projections to have the thickness smaller than that of the light guide panel and forming the inclined surface on the side of the light guide projections. According to an experiment, stress at point R of FIG. 2d was reduced as much as about 33% compared with that of the conventional backlight unit to be ranged below the yield stress.

The present invention also can reduce or eliminate light concentration at portions of the LCD by rounding or chamfering the corners of the light guide projections.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A light guide panel mounted to grooves in a mold frame of a backlight unit with a light source to guide light to the display panel, comprising:
   a plate-shaped body; having upper and lower surface;
   at least one light guide projection for fitting in the mold frame said light guide panel disposed on at least one of left side and right side of said plate-shaped body, said at least one light guide projection having top surface, bottom surface, a first side surface disposed parallel to the at least one of the left side and the right side of said plate-shaped body, a second side surface disposed adjacent the first side surface and remote from the light source, and a third side surface disposed adjacent to the first side surface and the light source;
   a plurality of patterns formed on said lower surface of said plate-shaped body to uniformly project light; and
   the top surface and the bottom surface of said light guide projection being disposed from said upper and lower surfaces of said plate-shaped body.

2. The light guide panel according to claim 1, wherein said light guide projection further includes an inclined surface disposed where the third side surface meets the at least one of the left side and the right side of said plate-shaped body.

3. The light guide panel according to claim 2, wherein at least one of corners between the first side surface and the second and the third side surfaces of said light guide projection is rounded and the mold frame has grooves corresponding to the rounded corner shape of said light guide projection.

4. The light guide panel according to claim 2, wherein at least one of corners between the first side surface and the second and the third side surfaces of said light guide projection is chamfered and the mold frame has grooves corresponding to the chamfered corner shape of said light guide projection.

5. The light guide panel according to claim 1, wherein at least one of corners between the first side surface and the second and the third side surfaces of said light guide projection is rounded and the mold frame has grooves corresponding to the rounded corner shape of said light guide projection.

6. The light guide panel according to claim 1, wherein at least one of corners between the first side surface and the second and the third side surfaces of said light guide projection is chamfered and the mold frame has grooves corresponding to the chamfered corner shape of said light guide projection.

7. A light guide panel for a flat panel display device, comprising:
   a plate-shaped body; and
   a pair of light guide projections disposed on the respective middle of at least one of left side and right side of said plate-shaped body, wherein the light guide projections are thinner than said plate-shaped body.

8. The light guide panel according to claim 7, wherein an interval between an upper surface of said plate-shaped body and an upper surface of each of said light guide projections is same as an interval between a lower surface of said plate-shaped body and a lower surface of each of said light guide projections.

9. The light guide panel according to claim 7 wherein an interval between an upper surface of said plate-shaped body and an upper surface of each of said light guide projections is different from an interval between a lower surface of said plate-shaped body and a lower surface of each of said light guide projections.

10. The light guide panel according to claim 7, wherein the flat panel display device includes a window-shaped mold frame having a pair of grooves formed respectively on its left side and right side and a light source disposed in its lower side;
   wherein the light guide panel is mounted on the mold frame so that a pair of said light guide projections are fit respectively to a pair of said grooves; and
   wherein each of the light guide projections further includes an inclined surface between the left or right side of said plate-shaped body and a side thereof adjacent to said light source.

11. The light guide panel according to claim 7, wherein shape of said light guide projection is rectangular.

12. A backlight unit, comprising:
   a mold frame;
   a light source mounted in a side of said mold frame; and
   a light guide panel for guiding light to the front having light guide projections disposed on left and right sides thereof,
   wherein said mold frame has grooves formed in left side and right side thereof adjacent to said light source, for the light guide projections of said light guide panel; and
   wherein upper surface and lower surface of the light guide projections are disposed remote as much as predetermined intervals, respectively from planes extending from said light guide panel.

13. The backlight unit according to claim 12, further comprising:
   a reflecting sheet disposed under said light guide panel to reflect light projected from said light source, to said light guide panel;

a diffusing sheet disposed on said light guide panel to uniformly diffuse light guided from said light guide panel;

a plurality of prism sheets disposed on said diffusing sheet to enhance the luminance of light passed through said diffusing sheet; and a protecting sheet disposed on said prism sheets to protect said prism sheets.

14. The backlight unit according to claim 13, wherein each of the light guide projections of said light guide panel further includes an inclined surface on a side adjacent to said light source.

15. The backlight unit according to claim 13, wherein at least one of corners of the light guide projections is rounded.

16. The backlight unit according to claim 13, wherein at least one of corners of said light guide projections is chamfered.

17. The backlight unit according to claim 12, wherein each of the light guide projections of said light guide panel further includes an inclined surface on a side adjacent to said light source.

18. The backlight unit according to claim 12, wherein at least one of corners of the light guide projections is rounded.

19. The backlight unit according to claim 12, wherein at least one of corners of said light guide projections is chamfered.

20. A liquid crystal display device, comprising:

a housing having an open hole;

a display panel disposed in said housing to display images through the open hole of said housing;

a backlight unit disposed behind said display panel, including a mold frame, a light source mounted in a side of the mold frame, a light guide panel for guiding light projected from the light source, to the front of said display panel; and a top chassis combined with the mold frame of said backlight unit to fixedly hold the light guide panel and said display panel, wherein the mold frame has grooves formed in left and right sides thereof adjacent to a side thereof on which the light source is disposed, wherein the light guide panel has light guide projections disposed on left and right sides for the grooves of the mold frame; and wherein upper surface and lower surface of the light guide projections are disposed remote as much as predetermined intervals, respectively from planes extending from upper surface and lower surface of the light guide panel.

21. The liquid crystal display device according to claim 20, wherein said backlight unit further includes:

a reflecting sheet disposed under the light guide panel to reflect light projected from the light source, to the light guide panel;

a diffusing sheet disposed on the light guide panel to uniformly diffuse light guided from the light guide panel;

a plurality of prism sheets disposed on said diffusing sheet to enhance the luminance of light passed through said diffusing sheet; and a protecting sheet disposed on said prism sheets to protect the prism sheets.

22. The liquid crystal display device according to claim 21, wherein at least one of corners of the light guide projections is rounded.

23. The liquid crystal display device according to claim 21, wherein at least one of corners of the light guide projections is chamfered.

24. The liquid crystal display device according to claim 21, wherein each of the light guide projections of the light guide panel further includes an inclined surface on a side adjacent to the light source.

25. The liquid crystal display device according to claim 20, wherein at least one of corners of the light guide projections is rounded.

26. The liquid crystal display device according to claim 20, wherein at least one of corners of the light guide projections is chamfered.

27. The liquid crystal display device according to claim 20, wherein each of the light guide projections of the light guide panel further includes an inclined surface on a side adjacent to the light source.

* * * * *